US006277280B1

(12) United States Patent
Houck (10) Patent No.: US 6,277,280 B1
(45) Date of Patent: Aug. 21, 2001

(54) SEPTIC TANK EFFLUENT FILTERING APPARATUS AND METHOD

(75) Inventor: Randall J. Houck, St. Augustine, FL (US)

(73) Assignee: E Z Flow, L.P., Oakland, TN (US)

(*) Notice: Subject to any disclaimer, the term of this patent is extended or adjusted under 35 U.S.C. 154(b) by 0 days.

(21) Appl. No.: 09/346,473

(22) Filed: Jul. 1, 1999

Related U.S. Application Data (60) Provisional application No. 60/091,605, filed on Jul. 2, 1998.

(51) Int. Cl.$^7$ ................................................. C02F 3/00
(52) U.S. Cl. ..................... 210/616; 210/119; 210/484; 210/532.2
(58) Field of Search .................... 210/615, 744, 210/747, 86, 119, 170, 435, 484, 500.34, 532.2, 289, 291, 616, 617, 460

(56) References Cited

U.S. PATENT DOCUMENTS

| | | | |
|---|---|---|---|
| 2,376,912 | * | 5/1945 | Green .................................. 210/744 |
| 2,521,833 | | 9/1950 | Dahl . |
| 2,540,272 | | 2/1951 | Malmstrom et al. . |
| 2,768,949 | | 10/1956 | Hewey . |
| 3,441,140 | | 4/1969 | Thurber . |
| 3,732,662 | | 5/1973 | Paxton . |
| 3,802,337 | | 4/1974 | St-Hiliare . |
| 3,815,323 | | 6/1974 | Longo . |
| 3,952,529 | | 4/1976 | Lefever . |
| 4,005,010 | * | 1/1977 | Lunt ..................................... 210/615 |
| 4,019,326 | | 4/1977 | Herveling et al. . |
| 4,044,525 | | 8/1977 | Forsgren . |
| 4,104,166 | * | 8/1978 | LaRaus ............................... 210/256 |
| 4,104,774 | | 8/1978 | Overmyer et al. . |
| 4,308,020 | | 12/1981 | Langen . |
| 4,319,998 | * | 3/1982 | Anderson ............................. 210/86 |
| 4,715,966 | * | 12/1987 | Bowman ............................. 210/86 |
| 4,716,712 | | 1/1988 | Gill . |
| 4,733,449 | | 3/1988 | Spearman . |
| 4,810,385 | * | 3/1989 | Hater et al. ......................... 210/615 |
| 5,015,123 | * | 5/1991 | Houck et al. ........................ 405/455 |
| 5,051,028 | | 9/1991 | Houck et al. . |
| 5,154,543 | | 10/1992 | Houck et al. . |

(List continued on next page.)

FOREIGN PATENT DOCUMENTS

| | | |
|---|---|---|
| 1210158 | 10/1970 | (AU) . |
| 25 55 036 | 6/1976 | (DE) . |
| 1159907 | 7/1958 | (FR) . |
| 2508271 | 12/1982 | (FR) . |

Primary Examiner—Duane Smith
Assistant Examiner—Frank M. Lawrence
(74) Attorney, Agent, or Firm—David A. Tamburro (57) ABSTRACT

A septic tank effluent filter includes a housing positioned external to and downstream a septic tank for receiving the effluent prior to it being released into a drainfield positioned downstream the housing. The housing includes an inlet port and an offset outlet ports on an opposing wall for connection between the septic tank and drainfield. A cylindrical container is carried within the housing and is connected directly to the outlet port for having the effluent flow from within the housing through the uniformly perforated cylindrical wall of the container to outlet port. A circular base plate of the container provides a baffle and prevents the undesirable direct streaming of the effluent from the inlet port to the outlet port. A plastic mesh bag is filled with polystyrene plastic beads having a large surface to volume ratio, thus a large surface area within a desirable space. The bead filled mesh bag is carried within the container such that the effluent entering the housing from the septic tank flows through the bead filled bag, permitting organic matter including bacteria to be collected on bead surfaces prior to the effluent flowing out of the housing and into the drainfield.

22 Claims, 10 Drawing Sheets

U.S. PATENT DOCUMENTS

| | | | | |
|---|---|---|---|---|
| 5,360,556 | * | 11/1994 | Ball et al. | 210/804 |
| 5,378,357 | | 1/1995 | Houck et al. . | |
| 5,427,679 | * | 6/1995 | Daniels | 210/532.2 |
| 5,535,499 | | 7/1996 | Houck et al. . | |
| 5,609,754 | * | 3/1997 | Stuth | 210/532.2 |
| 5,620,602 | * | 4/1997 | Stuth | 210/532.2 |
| 5,657,527 | | 8/1997 | Houck et al. . | |
| 5,766,454 | * | 6/1998 | Cox et al. | 210/150 |

* cited by examiner

SEPTIC TANK EFFLUENT FILTERING APPARATUS AND METHOD

CROSS REFERENCE TO RELATED APPLICATION

This application claims priority to Provisional Application Ser. No. 60/091,605 for "Septic Tank Drainfield Filter" having a filing date of Jul. 2, 1998, and commonly owned with the instant invention.

FIELD OF INVENTION

The present invention relates to filtering effluent in septic tank systems and, more particularly, to a drainfield filter for reducing organic matter including bacteria levels within the effluent prior to discharging to a drainfield.

BACKGROUND

The monitoring of effluent discharge from a septic tank, prior to its discharge into a drainfield, is know, as disclosed in U.S. Pat. No. 4,319,998 to Anderson, which discloses a screen positioned within a housing located downstream the septic tank. When the screen becomes clogged by suspended solids released from the septic tank, a float positioned within the housing and upstream the screen rises as a result of fluid level rising within the housing. Such is useful in warning of impending drainfield malfunction, but has no effect on the requirements for absorption of effluent within the drainfield. Absorption fields, such as the septic tank drain fields, receiving effluent from a treatment facility may be reduced in size by up to 50% of that normally required if the effluent is tested by a certified ANSI testing facility or NSF and meets the classification for a Class 1 effluent. As a result, a significant increase in usable real estate can result for replacement of ground space typically taken up by a septic tank drainfield. To achieve such a classification, a reduction in the organic matter including bacteria levels within the effluent must be achieved. Often times, septic tank filters rely on aerobic treatment of the affluent, as described by way of example in U.S. Pat. No. 5,620,602 to Stuth, which discloses an aerobic digester mounted in a secondary compartment of the septic tank for receiving aerated waste frothed upward from the effluent within the tank and allowed to cascade downward over packing media. The use of filtering media having a high surface to volume ratio is desirable, yet leads itself to clogging and as a result replacement that is time consuming and often expensive. A need exists for an economical treatment of effluent easily accommodated by a typical septic tank system owner, which treatment reduces the organic matter including bacteria levels within the effluent to achieve the Class 1 effluent classification.

SUMMARY OF THE INVENTION

In view of the foregoing background it is therefore an object of the invention to improve the quality of effluent within a septic tank system before the effluent reaches the drainfield. Further, it is an object of the invention to provide a filtering medium with a large surface to volume ratio for placement downstream of the septic tank and upstream of the drainfield for removing organic matter including bacteria from the effluent leaving the septic tank. It is yet another object of the invention to provide a simple, low cost, and easy-to-use filter for removing such organic matter including bacteria from the effluent.

This and other objects, advantages and features of the present invention are provided by a septic tank effluent filtering apparatus comprising a housing having an inlet port and an outlet port for transferring effluent received from a septic tank therethrough to a drainfield, a container having a plurality of perforations therein, the container removably carried within the housing in fluid communication with the outlet port for receiving effluent therein through the plurality of perforations for passage through the container and out of the housing through the outlet port, and a plurality of plastic beads carried within the container, wherein the effluent enters the housing through the inlet port, flows through the plurality of plastic beads, passing over the bead surfaces, while permitting organic matter including bacteria to be collected thereon prior to the effluent flowing out of the housing through the outlet port thereof. In a preferred embodiment of the present invention, the plurality of beads is carried within a mesh bag positioned within the container for easy placement and removal therefrom. Further, effluent level indicator means is provided for indicating the level of effluent within the housing. In one embodiment, the indicator means comprise a float communicating with the effluent within the housing and an indicator rod extending upwardly through a cover in the housing for providing a level indication to a user.

A method aspect of the present invention comprises the steps providing a housing having inlet and outlet ports therein for flowing effluent therethrough, placing a container within the housing in fluid communication with the outlet port, the container having a perforated wall for passing the effluent therethrough, wherein the container receives effluent through the perforated wall for passage of the effluent out of the housing through the outlet port, and placing a plurality of plastic beads into the container, wherein the effluent entering the housing through the inlet port flows through the plurality of plastic beads, passing over the bead surfaces for permitting organic matter including bacteria to be collected thereon prior to the effluent flowing out of the housing through the outlet port thereof. In a preferred method, the plurality of beads are carried within a deformable plastic bag which is placed within the container for ease in replacing the beads with clean beads.

BRIEF DESCRIPTION OF THE DRAWINGS

A preferred embodiment of the invention, as well as alternate embodiments, are described by way of example with reference to the accompanying drawings in which:

FIGS. 9b and 9c are plan views of a removable screen and perforated plate, respectively, for the embodiment of FIG. 9a;

FIGS. 10b and 10c illustrate screen and mesh bag elements, respectively, of the embodiment of FIG. 10a;

FIGS. 11b and 11c are perspective views of a screen container and mesh bag, respectively, of the embodiment of FIG. 11a.

DESCRIPTION OF PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
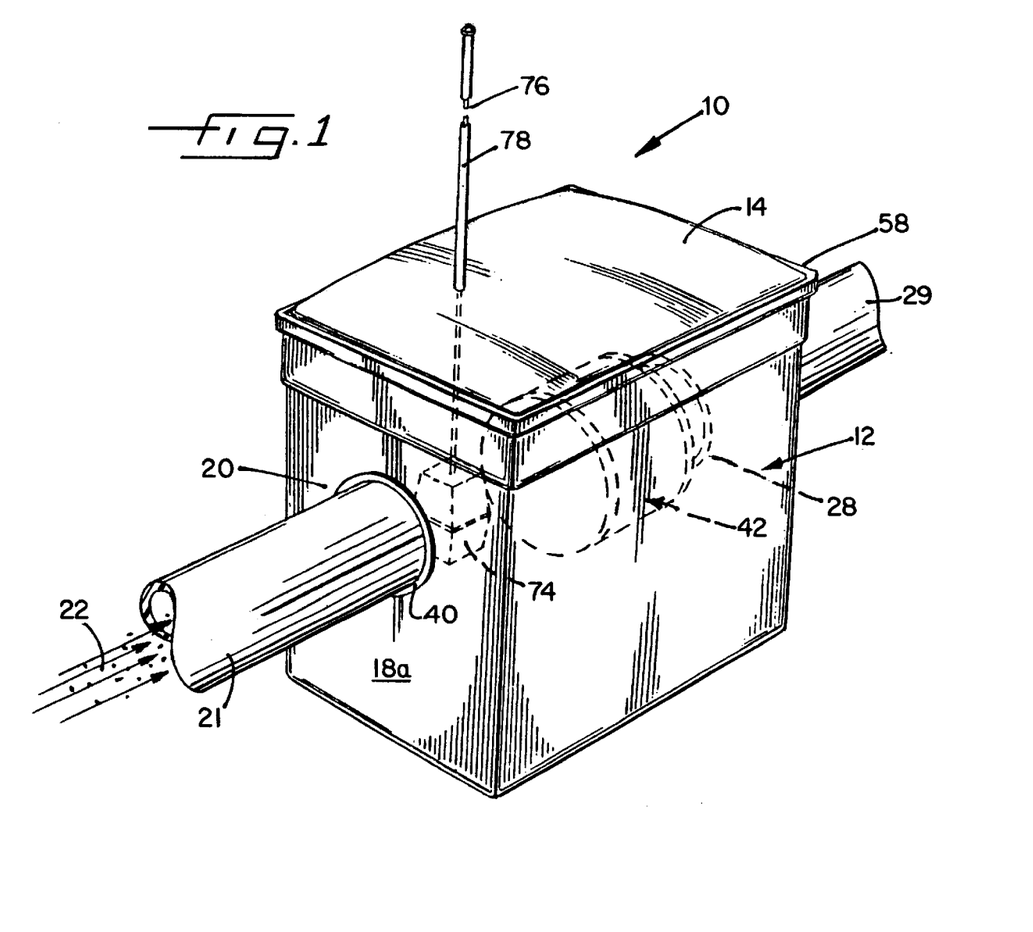
FIG. 1 is a perspective view of one preferred embodiment of the septic tank effluent filtering apparatus of the present invention.
Figure 2:
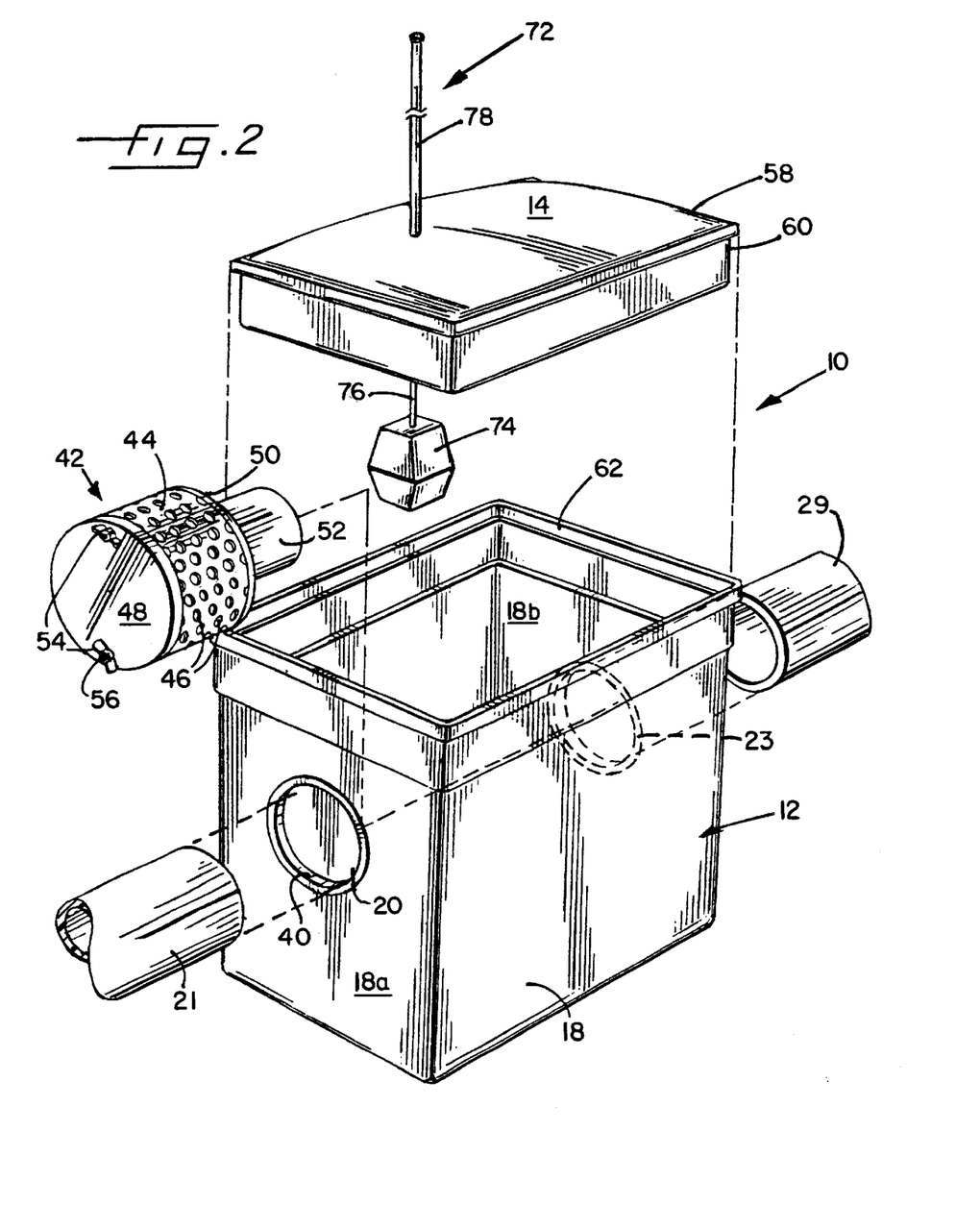
FIG. 2 is a perspective exploded view of the apparatus of FIG. 1.
Figure 3:
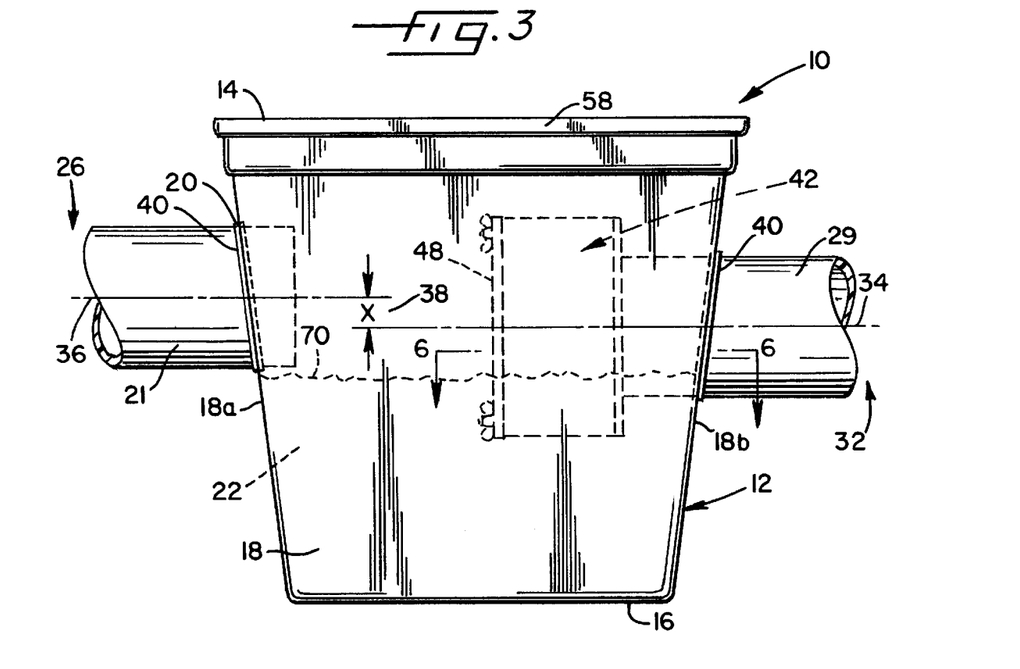
FIG. 3 is a partial side elevation view of the embodiment of FIG. 1.
Figure 4:
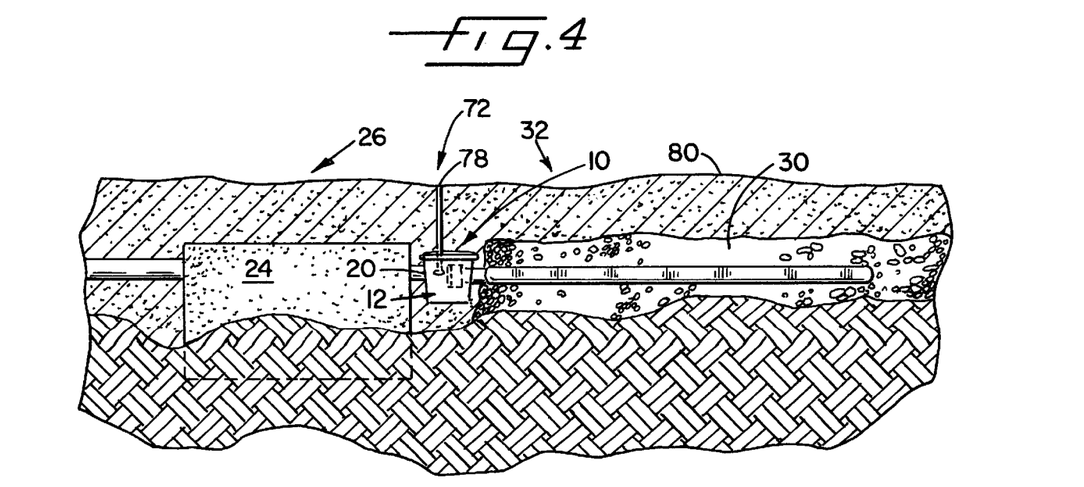
FIG. 4 is a partial cross-sectional view of a septic tank drainfield illustrating use of the filter of FIG. 1 positioned upstream of the drainfield, by way of example.

Referring initially to FIGS. 1–3, an effluent filtering apparatus 10 comprises a generally rectangular shaped housing 12 having a top wall 14, a bottom wall 16, and four side walls 18. As one of ordinary skill in the art will appreciate, alternate housing shapes, including those having square, circular, oval, and generally arcuate cross-sections are possible and may be selected as desired by the user. For the embodiment herein described, by way of example, the housing 12 includes an inlet port 20 within a first side wall 18a for receiving effluent 22 from a septic tank 24 positioned upstream 26 the housing, as illustrated with reference to FIG. 4 The housing 12 further includes an outlet port 28 within a second side wall 18b opposing the first side wall 18a, for delivering the effluent 22 to a drainfield 30 positioned downstream 32 the housing, as illustrated with reference again to FIG. 4. It is effective having the apparatus 10 located upstream of the drainfield, however, alternate locations are possible to meet a desired use. In a preferred embodiment of the present invention, circular inlet and outlet ports are provided for accommodating readily available circular cross section pipe typically used in the trade. Further, to accommodate effluent flow requirements for septic tank systems, and ease in installation of the apparatus 10 therein, the axis 34 of the outlet port 28 is offset from the axis 36 of the inlet port 20, illustrated in FIG. 3 as offset 38 having x-dimension, by way of example. In the embodiment herein described, flanged seal rings 40 are fitted within the ports 20, 28 for receiving inlet and outlet pipes 21, 29 in a sealing arrangement with the housing side walls 18, and thus prevent leaking of effluent 22 from the housing 12. In a preferred embodiment, the housing 12 is formed from plastic.

Figure 5:
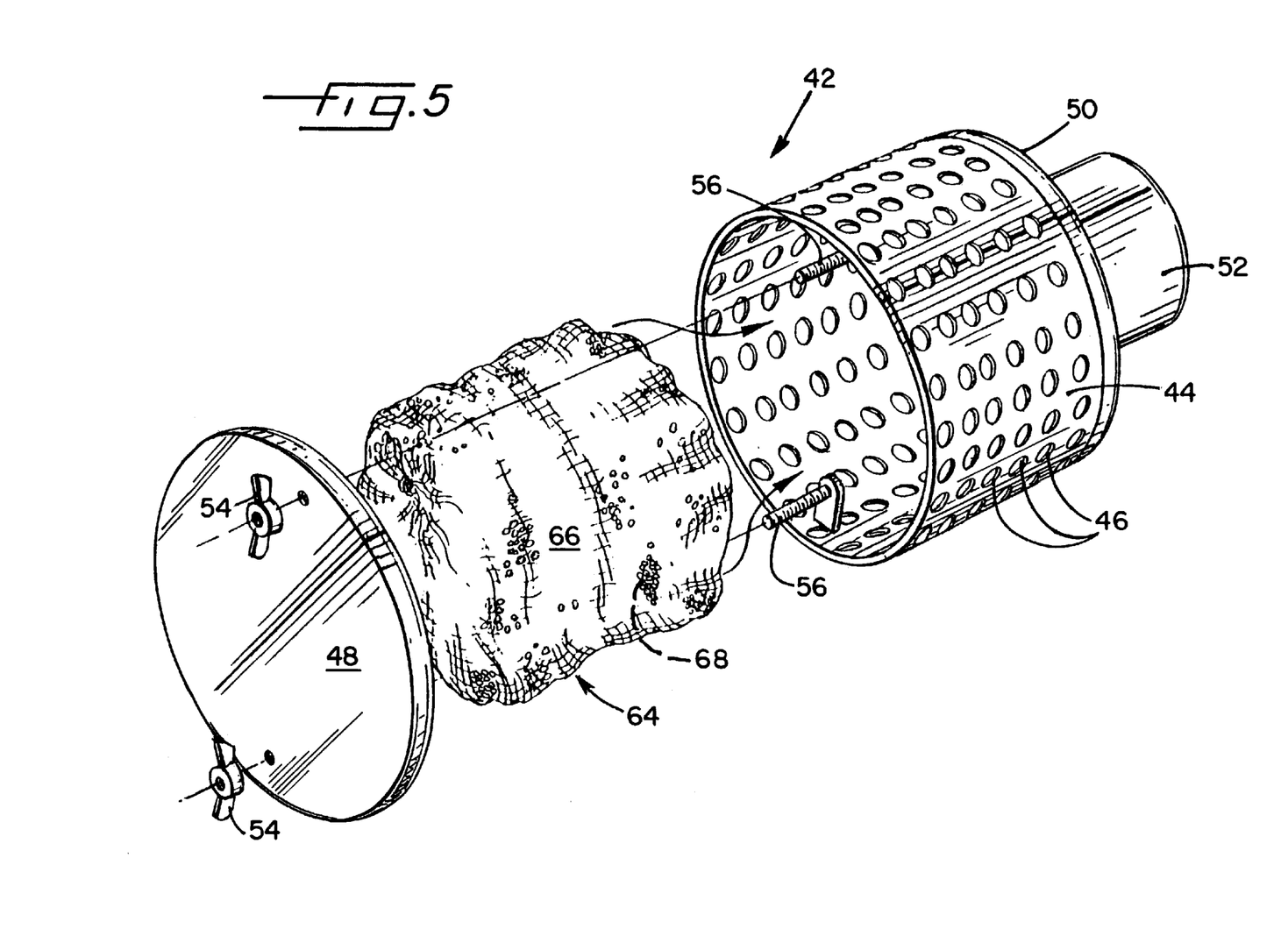
FIG. 5 is a perspective exploded view of a filtering bead container of the embodiment of FIG. 1.

As illustrated with reference again to FIGS. 1–3, and particular reference to FIG. 5, one preferred embodiment of the present invention, as herein described by way of example, includes a cylindrical container 42 carried within the housing 12 and is connected to the outlet port 28. The cylindrical container 42 includes a perforated cylindrical side wall 44 which has perforations 46 uniformly distributed throughout the side wall. The cylindrical container has a solid base which performs as a baffle plate 48 for preventing effluent 22 from streaming directly from the inlet port 20 to the outlet port 28 without first circulating within the housing 12. The opposing base 50 of the cylindrical container 42 is opened for effluent flow therethrough and includes an outlet flange 52 for connection to the outlet port 28 and pipe 29. As illustrated with reference again to FIG. 3, the baffle plate 48 axially opposes the outlet port 28. The cylindrical container 42 is thus in fluid communication with the outlet port 28 for receiving effluent through the perforated cylindrical side wall 44 for passage out of the housing 12 through the outlet pipe 29.

In the embodiment herein described by way of example, it is convenient to have the baffle plate 48 removably attached to the perforated side wall 44 for providing access to within the cylindrical container 42. Wing nuts 54 and bolts 56 attached to the side wall 44 as illustrated with reference again to FIG. 5, provide ease in manually removing the plate 48 while the container is secured within the housing 12 during operation. As further illustrated with reference again to FIG. 2, by way of example, the housing 12 includes a removable cover 58 forming the top wall 14. The cover 58 is made of the same plastic material as the housing, which are somewhat flexible for providing a flanged peripheral edge 60 of the cover to provide a sealing fit through a friction fit within the an opening 62 of the top wall 14 thus preventing undesirable dirt and water from getting into the housing and the effluent from leaking out. The removably attached cover 58 provides ease in accessing the plate 48.

Figure 6:
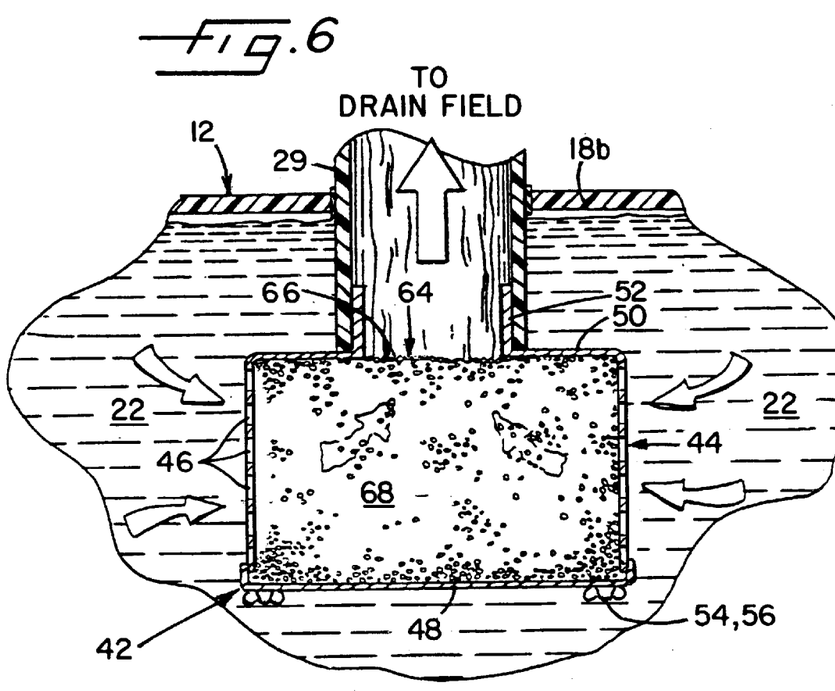
FIG. 6 is a cross-sectional view taken through line 6—6 of FIG. 3 illustrating filtering beads carried by a bead container.

With reference again to FIG. 5, and to FIG. 6. the apparatus 10 further includes a deformable plastic bag 64 having meshed walls 66 for allowing the effluent 22 readily pass through. The mesh bag 64 is carried within the cylindrical container 42 and generally filling the container, taking its cylindrical shape. As will be appreciated by those of ordinary skill in the art, alternate containers will includes various rectangular and arcuate shapes as desired. Ease of construction and success in operation has resulted in the cylindrical shape a one preferred embodiment. A plurality of polystyrene plastic beads 68 are carried within the mesh bag 64. The beads 68 are selected because of the high surface area to volume ratio which has proven to be effective in allowing the effluent 22 entering the housing 12 through the inlet port 20 to flow over the bead surfaces and permit organic matter including bacteria carried within the effluent to be collected on the large surface area presented by the beads prior to the effluent flowing out of the housing through the outlet port 28. The mesh bag 64 permits easy handling of a large quantity of the filtering beads 68 during installation and replacement of the beads. Further, the use of polystyrene plastic beads 68 is only one preferred embodiment for the plastic beads. Polystyrene plastic is relatively inexpensive, and has been shown to be effective in providing a large surface within a desirably small yet effective space, a feature of the present invention. The use of alternate filtering media and filter construction will come to the mind of those skilled in the art as a result of the teachings of the present invention. As earlier described with reference to FIG. 3, the baffle plate 48 prevents an effluent flow from the inlet port 20 to be forced directly to the outlet port 28 and thus through the container 42. This also permits the effluent 22 to take a somewhat random and longer time to pass through the filtering beads 68, and provide an effective bacteria styled filtering of the effluent. To replace the beads 68, access to the container 42 is made through the removable cover 58 into the housing 12, for moving the baffle plate 48 and replacing a used mesh bag 64 with a fresh mesh bag carrying a clean set of polystyrene beads 68.

Figure 7:
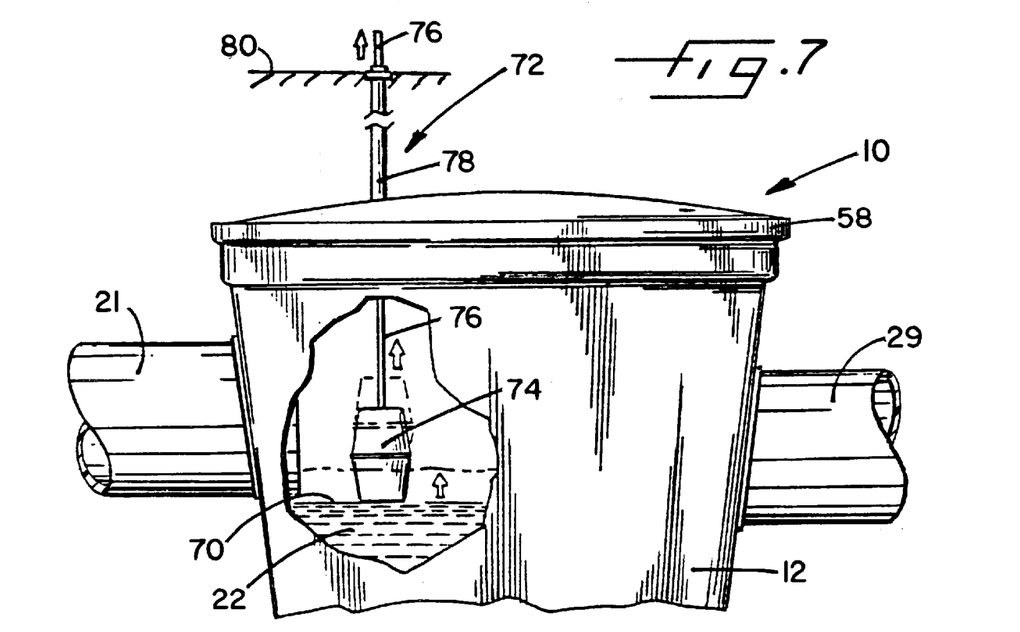
FIG. 7 is a partial cut-a-way side elevation view of the embodiment of FIG. 1 illustrating effluent level indication means.

As the beads 68 collect the organic matter including bacteria, flow through the housing 12 is slowed down and an effluent level 70 within the housing rises, as illustrated with reference again to FIG. 3. To monitor the effluent level 70, which provides an indication that the beads 68 should be examined or replaced, an effluent level indicator 72 is carried by the housing 12 for indicating the level 70 of effluent 22 within the housing. In one embodiment of the apparatus 10, the level indicator 72 includes a float 74 within the housing 12 for floating on the effluent 22, as illustrated with reference again to FIGS. 1 and 2, and specifically to FIG. 7. An elongate rod 76 extends outwardly from the housing 12 through a conduit 78 for indicating the effluent level 70 to an observer. Generally, the conduit 78 will extend from the housing 12 to a ground surface level 80 to allow the rod 76 to protrude above the ground level for viewing by the observer without the need for accessing viewing or accessing the housing 12.

Alternate embodiments will come to the mind of those of ordinary skill in the art without departing from the teachings of the present invention. By way of example, the polystyrene beads 68 earlier will be freely disbursed within the housing 12 or contained within various containers 42 having a variety of forms. By way of example, such alternate embodiments are described with reference to FIGS. 8–11b.

Figure 8:
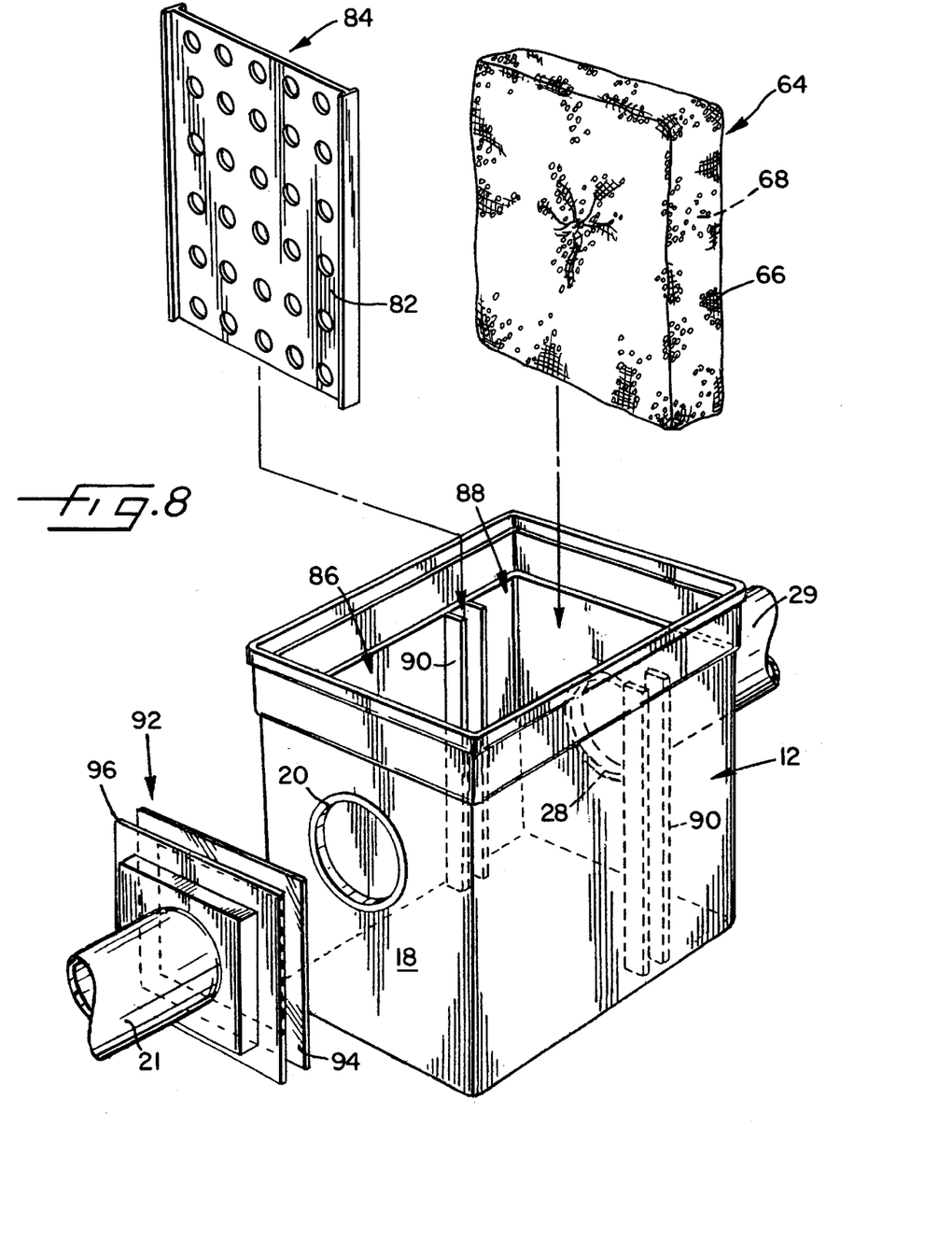
FIG. 8 is a partial exploded perspective view of a second embodiment of the present invention.

With reference first to FIG. 8, the beads 68 are carried within the mesh bag 64 which is positioned between the outlet port 28 and a perforated plate 82, or screen as desired to form a partition wall 84 within the housing 12. The partition wall 84 separates an inlet side 86 from an outlet side 88 of the housing 12. The mesh bag 64 containing the filtering beads 68 is preferably positioned on the outward side 88. The partition wall 84 is removable secured to the housing side walls using grooved plates 90 for ease in removal for cleaning. Alternate sealing means 92 for connection of the pipe 21, 29 are provided by a gasket 94 carried within a gasket housing 96 attached to the housing side wall 18.

Figure 9A:
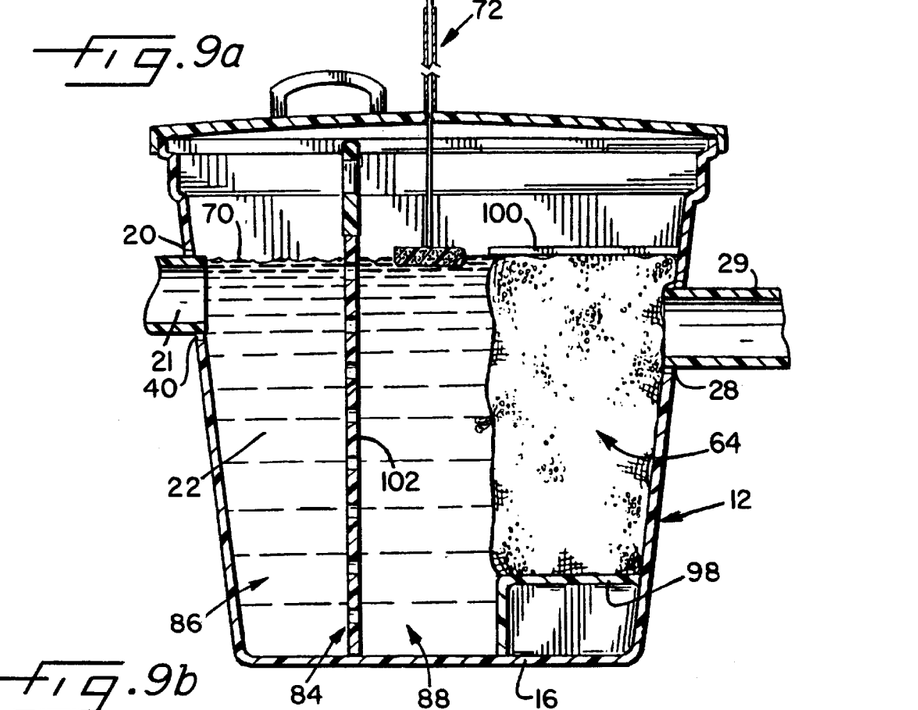
FIG. 9a is a partial cross-section elevation view of a third embodiment of the present invention.
Figure 9B:
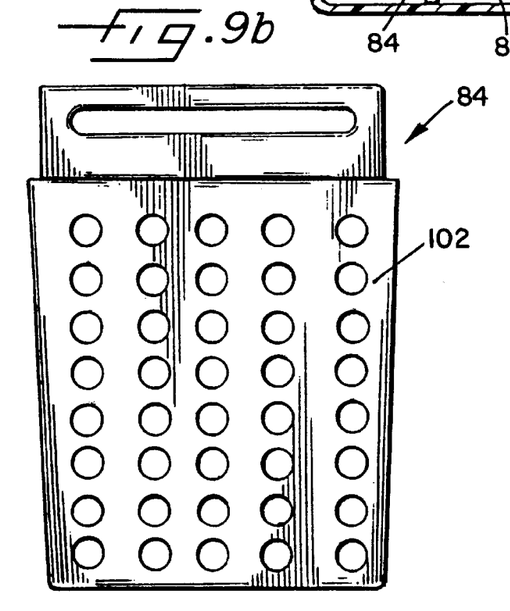
Figure 9C:
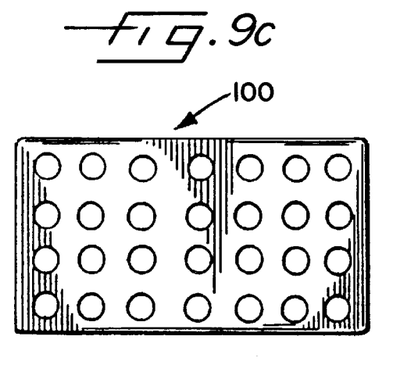

As illustrated with reference to FIGS. 9a, 9b and 9c, yet another embodiment of the apparatus includes the mesh bag 64 being held in place between a shelf 98 raised from the bottom wall 16 of the housing 12 and a horizontally positioned perforated plate 100, both of which are positioned proximate the outlet port 28 of the housing 12. A removable screen 102 provides the partition wall 84, inlet side 86, and outlet side 88, as earlier described with reference to FIG. 8. The level indicator 72 is operable on the outlet side 88, as illustrated and on the inlet side 86 as desired for measuring effluent levels within the housing 12.

Figure 10A:
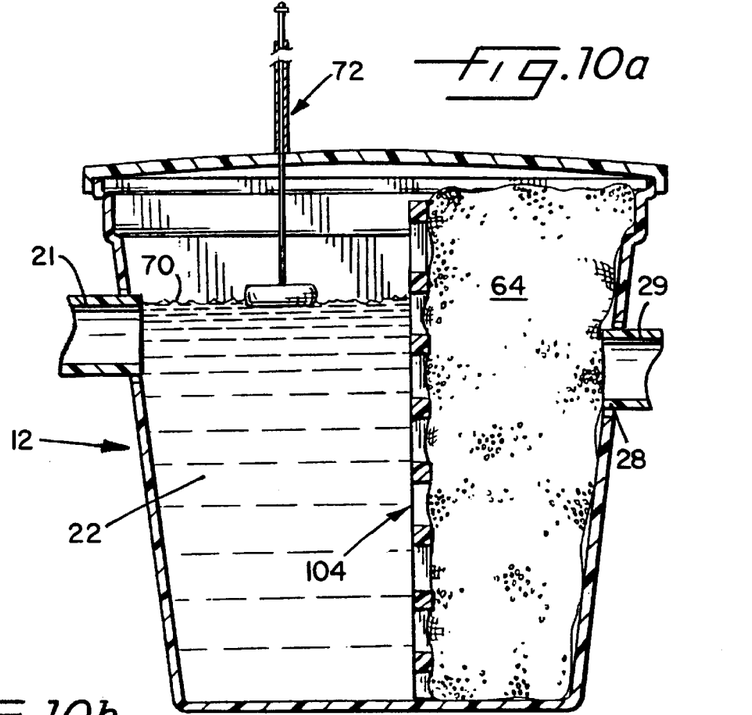
FIG. 10a is a side cross-section view of a fourth embodiment of the present invention.
Figure 10B:
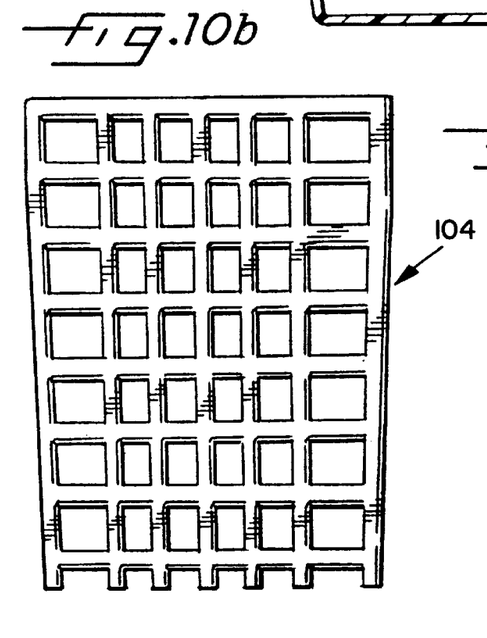
Figure 10C:
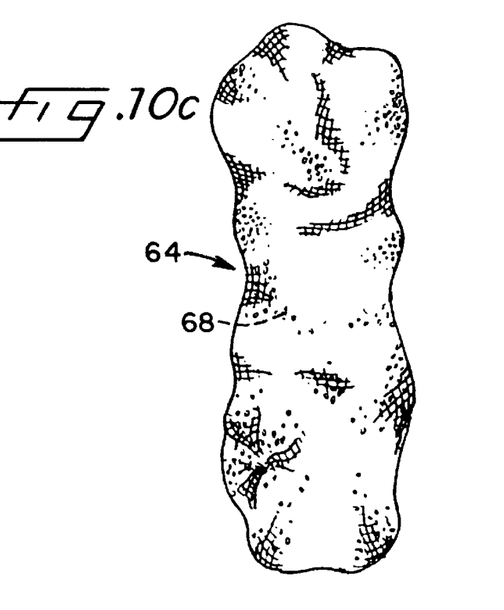
Figure 11A:
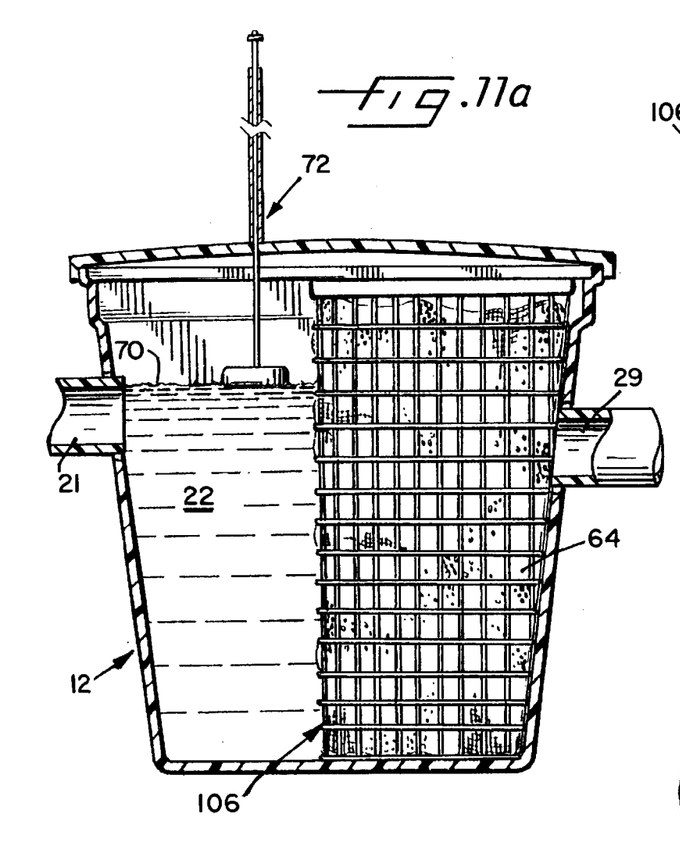
FIG. 11a is a side cross-section view of a fifth embodiment of the present invention.
Figure 11B:
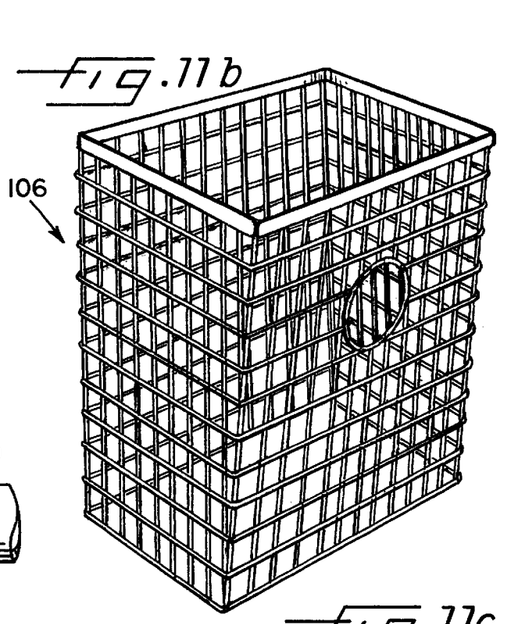
Figure 11C:
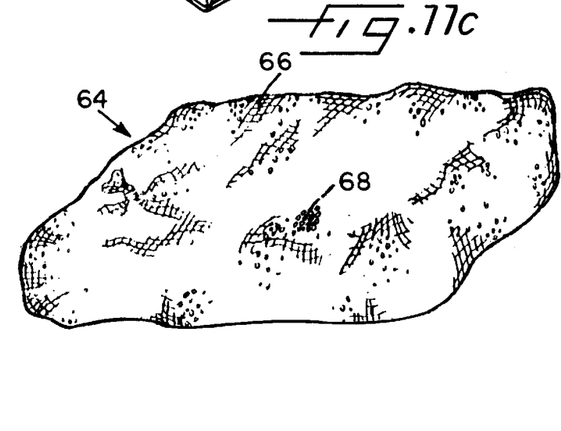

As illustrated with reference to FIG. 10a–10c, another embodiment includes a plastic screen 104 or grate replacing the perforated plate 82 described earlier with reference to FIG. 8. The screen 104 holds the mesh bag 64 filled with the beads 68 proximate the outlet port 28. As illustrated with reference to FIGS. 11a, 11b and 11c, yet another embodiment includes a screened wall container 106 for carrying the mesh bag 64. The screened wall container 106 is removed from the housing 12 for easy replacement of the mesh bag 64.

Figure 12:
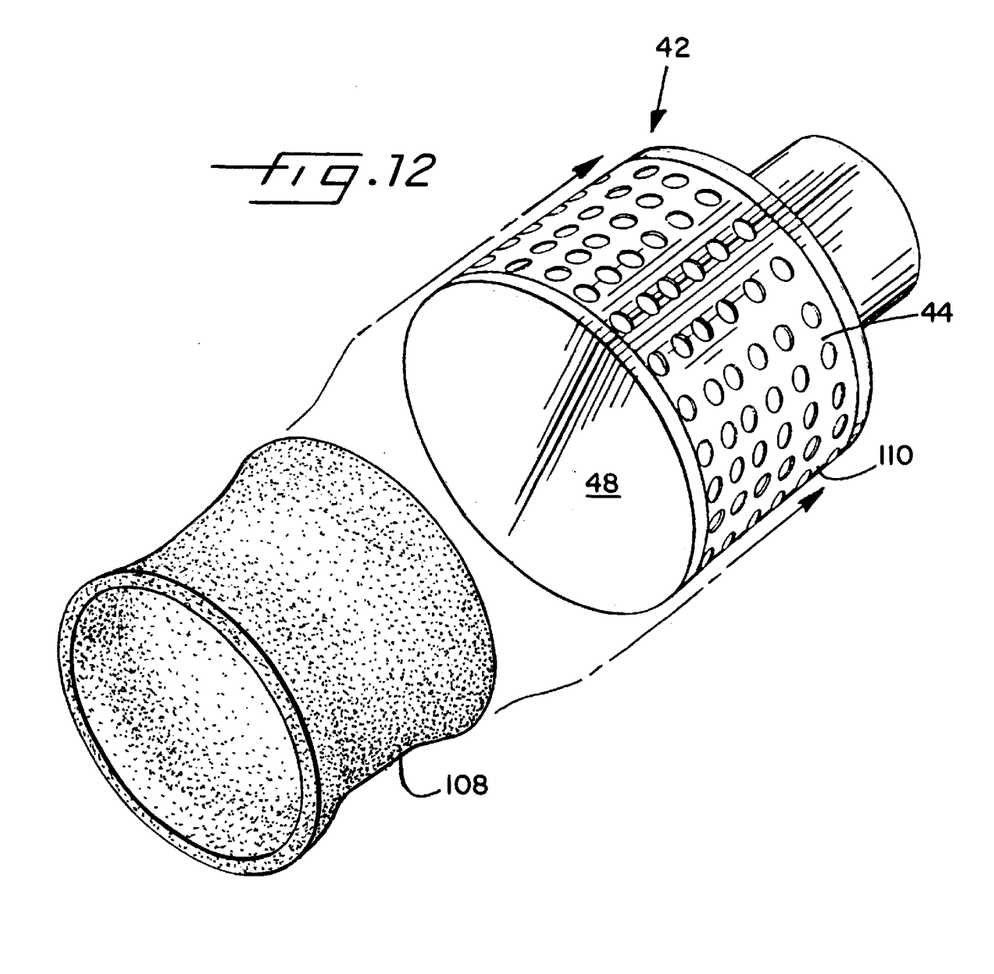
FIG. 12 is an exploded perspective view of an alternate embodiment of a filtering container of FIG. 5, illustrating a sleeved filter material carried by the container.

As illustrated with reference to FIG. 12, and again to FIG. 5, a porous foam sleeve 108 is carried on the surface 110 of the cylindrical container 42, rather than the container carrying the beads 68 therein. The baffle plate 48 for the embodiment illustrated with reference to FIG. 12 is fixed to the perforated cylindrical wall 44. With such an arrangement, effluent will first flow through the porous sleeve 108 and into the container 42 through the perforated side wall 44 before passing out of the housing 12.

Many modifications and other embodiments of the invention will come to the mind of one skilled in the art, having the benefit of the teachings presented in the foregoing descriptions and the associated drawings. Therefore, it is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

That which is claimed is:

1. A septic tank effluent filtering apparatus comprising:
    a housing having top, bottom, and side walls, the housing having an inlet port within a first side wall portion for receiving effluent from a septic tank positioned upstream the housing, the housing further having an outlet port within an opposing second side wall portion for delivering the effluent to a drainfield positioned downstream the housing, wherein an axis of the outlet port is offset vertically below an axis of the inlet port;
    a cylindrical container carried within the housing in fluid connection with the outlet port, the cylindrical container having a perforated cylindrical side wall including a plurality of perforations uniformly distributed thereon for passing effluent therethrough, the cylindrical container having a base forming a baffle plate for preventing effluent flow therethrough, the baffle plate axially opposing the outlet port, wherein the cylindrical container is in fluid communication with the outlet port for receiving effluent through the perforated cylindrical side wall for passage out of the housing through the outlet port;
    a deformable plastic bag having meshed walls for passing effluent therethrough, the deformable plastic bag carried within the cylindrical container; and
    a plurality of plastic beads carried within the plastic bag, wherein the plurality of plastic beads provides a surface area sufficient for having the effluent entering the housing through the inlet port flow through the plurality of plastic beads, passing over the bead surfaces, and permitting organic matter including bacteria to be retained thereon while permitting the effluent to flow out of the housing through the outlet port thereof.

2. The apparatus according to claim 1, further comprising effluent level indicator means carried by the housing for indicating a level of effluent within the housing.

3. The apparatus according to claim 2, wherein the effluent level indicator means comprise:
    a float communicating with the effluent within the housing; and
    an elongate rod extending outwardly from the housing for indicating the effluent level therein.

4. The apparatus according to claim 1, further comprising a cover forming the top wall of the housing, the cover removably attached thereto for providing access into the housing.

5. The apparatus according to claim 1, wherein the baffle plate is removably attached to the perforated side wall for providing access to within the cylindrical container for insertion and removal of the plastic bag and thus the plurality of plastic beads.

6. The apparatus according to claim 1, wherein each of the plurality of plastic beads are formed from a polystyrene plastic.

7. A septic tank effluent filtering system comprising:

a septic tank and a drainfield in fluid communication therewith;

a housing separate from the septic tank and in fluid communication between the septic tank and the drainfield, the housing positioned downstream and external to the septic tank for having effluent flow from the septic tank through the housing and into the drain field, the housing having an inlet port within a first side wall portion for receiving effluent from the septic tank and an outlet port within an opposing second side wall portion for delivering the effluent therefrom and to the drainfield, an axis of the outlet port being vertically below an axis of the inlet port;

a container carried within the housing, the container having a plurality of perforations therein for passing effluent therethrough, wherein the container is in fluid communication with the outlet port for receiving effluent through the plurality of perforations for passage through the outlet port; and a plurality of beads carried within the container, the plurality of beads providing a surface area sufficient for allowing the effluent entering the housing through the inlet port to flow through the plurality of beads, passing over the bead surfaces, and permitting organic matter including bacteria to be retained thereon prior to the effluent flowing out of the housing through the outlet port thereof.

8. The system according to claim 7, wherein the container comprises a cylindrical container having a cylindrical side wall with the plurality of perforations therein, and a base forming a baffle plate for preventing effluent flow therethrough, the baffle plate axially opposing the outlet port.

9. The system according to claim 7, wherein the container comprises a plastic bag having meshed walls including the plurality of perforations for passing effluent therethrough.

10. The system according to claim 7, wherein the container comprises:

a cylindrical container having a cylindrical side wall with the plurality of perforations therein; and a deformable plastic bag carried within the cylindrical container, the deformable plastic bag having walls including the plurality of perforations for passing effluent therethrough.

11. The system according to claim 7, further comprising effluent level indicator means operable with the housing for indicating a level of effluent therein.

12. The system according to claim 7, wherein the housing includes an opening within a wall thereof sufficient for retrieving the container therefrom, and a cover removably attached thereto.

13. The system according to claim 7, wherein the plurality of beads include polystyrene plastic beads.

14. A septic tank effluent filtering apparatus comprising:

a housing having an inlet port on one side thereof and an outlet port on another side thereof for transferring effluent received from a septic tank therethrough to a drainage field, an axis of the outlet port being vertically below an axis of the inlet port;

a container having a plurality of perforations therein, the container removably carried within the housing in fluid communication with the outlet port for receiving effluent therein through the plurality of perforations for passage through the container and out of the housing through the outlet port; and a plurality of beads carried within the container closely adjacent said outlet port, wherein the effluent enters the housing through the inlet port, flows through the plurality of beads, passing over the bead surfaces, wherein organic matter including bacteria is collected on the plurality of beads prior to the effluent flowing out of the housing through the outlet port thereof.

15. The apparatus according to claim 14, wherein the container comprises an arcuate shape.

16. The apparatus according to claim 14, further comprising a baffle plate carried by the housing between the inlet port and the container for disturbing effluent flow streaming directly toward the container.

17. The apparatus according to claim 14, wherein the container comprises a plastic bag having walls including the plurality of perforations.

18. The apparatus according to claim 14, wherein the container comprises:

an arcuate shaped container having an arcuate side wall with the plurality of perforations therein; and a deformable plastic bag carried within the arcuate container, the deformable plastic bag having walls including the plurality of perforations.

19. The apparatus according to claim 14, further comprising effluent level indicator means operable with the housing for indicating a level of effluent therein.

20. The apparatus according to claim 14, wherein the housing includes an opening within a wall thereof sufficient for retrieving the container therefrom, and a cover removably attached thereto.

21. The apparatus to claim 14, wherein the plurality of beads include polystyrene plastic beads.

22. A method of filtering effluent flowing out of a septic tank for depositing the filtered effluent into a drainfield, the method comprising the steps of:

placing a housing mid-stream the septic tank and drainfield;

connecting an inlet port between the housing and the septic tank for receiving effluent therefrom;

connecting an outlet port between the housing and drainfield for transferring the effluent thereto;

offsetting axes of the inlet and outlet ports with the axis of the outlet port below the axis of the inlet port;

placing a container within the housing in fluid communication with the outlet port, the container having a perforated side wall for passing effluent therethrough and a baffle plate removably attached to the perforated side wall, wherein the container receives effluent through the perforated side wall for passage of the effluent out of the housing through the outlet port;

providing a plurality of plastic beads, wherein each of the plurality of plastic beads has a surface area to volume ratio for providing a surface area for the plurality of beads sufficient for retaining organic matter including bacteria carried by the effluent thereon;

providing a deformable plastic bag having meshed walls for passing effluent therethrough;

filling the deformable plastic bag with the plurality of plastic beads; and placing the bead filled bag into the container, wherein the effluent entering the housing through the inlet port flows through the plurality of plastic beads, passing over the bead surfaces for permitting organic matter including bacteria to be collected thereon prior to the effluent flowing out of the housing through the outlet port thereof;

providing the housing with an opening and a cover over the opening;

removing the cover;

removing the baffle plate from the side wall;

removing the bag from the container;

placing a bag having a plurality of clean plastic beads therein into the container;

fastening the baffle plate to the side wall; and placing the cover over the opening.

* * * * *